United States Patent
Chung et al.

(10) Patent No.: US 9,418,769 B2
(45) Date of Patent: Aug. 16, 2016

(54) CONDUCTIVE CARBON NANOTUBE-METAL COMPOSITE INK

(75) Inventors: Jae-woo Chung, Yongin-si (KR);
Seung-hyun Baik, Suwon-si (KR);
Joong-hyuk Kim, Seoul (KR); Ru-jun Ma, Suwon-si (KR); Young-seok Oh, Suwon-si (KR); Dae-woo Suh, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 402 days.

(21) Appl. No.: 12/926,152

(22) Filed: Oct. 28, 2010

(65) Prior Publication Data

US 2011/0198542 A1    Aug. 18, 2011

(30) Foreign Application Priority Data

Feb. 18, 2010   (KR) .................. 10-2010-0014732

(51) Int. Cl.
| | |
|---|---|
| H01B 1/02 | (2006.01) |
| B82Y 30/00 | (2011.01) |
| B82Y 40/00 | (2011.01) |
| C01B 31/02 | (2006.01) |
| H01B 1/04 | (2006.01) |

(52) U.S. Cl.
CPC . H01B 1/02 (2013.01); B82Y 30/00 (2013.01); B82Y 40/00 (2013.01); C01B 31/0273 (2013.01); H01B 1/04 (2013.01)

(58) Field of Classification Search
CPC ............ H01B 1/04; C09C 1/44; B82Y 30/00; B82Y 40/00
USPC ................ 252/500–518.1; 977/755, 784, 810
See application file for complete search history.

(56) References Cited

U.S. PATENT DOCUMENTS

| | | | |
|---|---|---|---|
| 7,040,948 B2 | 5/2006 | Mao et al. | |
| 2005/0260120 A1* | 11/2005 | Smalley et al. | ............. 423/447.1 |
| 2006/0280912 A1* | 12/2006 | Liang et al. | ................... 428/173 |
| 2007/0265379 A1* | 11/2007 | Chen et al. | ................... 524/404 |

(Continued)

FOREIGN PATENT DOCUMENTS

| | | |
|---|---|---|
| JP | 2007-177103 | 7/2007 |
| JP | 2007-279081 | 10/2007 |

(Continued)

OTHER PUBLICATIONS

Georgakilas et al. ("Decorating carbon nanotubes with metal or semiconductor nanoparticles." J Mater Chem, 17, pp. 2679-2694, May 3, 2007).*

(Continued)

Primary Examiner — Tri V Nguyen
(74) Attorney, Agent, or Firm — Harness, Dickey & Pierce, P.L.C.

(57) ABSTRACT

An electrically conductive carbon nanotube-metal composite ink may include a carbon nanotube-metal composite in which metal nanoparticles are bound to a surface of a carbon nanotube by chemical self-assembly. The electrically conductive carbon nanotube-metal composite ink may have higher electrical conductivity than a commonly used metal nanoparticles-based conductive ink, and may also be used in deformable electronic devices that are flexible and stretchable, as well as commonly used electronic devices, due to the bending and stretching properties of the carbon nanotube itself.

10 Claims, 2 Drawing Sheets

(56) References Cited

U.S. PATENT DOCUMENTS

| | | | |
|---|---|---|---|
| 2008/0076837 A1* | 3/2008 | Kuper et al. | 516/32 |
| 2008/0096456 A1* | 4/2008 | Yoon et al. | 445/51 |
| 2008/0206488 A1* | 8/2008 | Chung et al. | 427/596 |
| 2008/0236444 A1 | 10/2008 | Enciu et al. | |
| 2008/0260995 A1 | 10/2008 | Hirakoso et al. | |
| 2008/0268233 A1* | 10/2008 | Lawin et al. | 428/327 |
| 2010/0009432 A1* | 1/2010 | Lee et al. | 435/287.2 |
| 2010/0047522 A1* | 2/2010 | Sivarajan et al. | 428/143 |
| 2010/0104926 A1* | 4/2010 | Baret et al. | 429/44 |
| 2010/0133513 A1* | 6/2010 | Schmidt | 257/25 |
| 2010/0167051 A1* | 7/2010 | Goia et al. | 428/402 |
| 2010/0314988 A1* | 12/2010 | Yang et al. | 313/311 |
| 2011/0014550 A1* | 1/2011 | Jiang et al. | 429/528 |
| 2011/0053050 A1* | 3/2011 | Lim et al. | 429/524 |
| 2011/0081546 A1* | 4/2011 | Kim et al. | 428/372 |

FOREIGN PATENT DOCUMENTS

| | | | | |
|---|---|---|---|---|
| JP | 2009-059653 | | 3/2009 | |
| JP | 2009-152598 | | 7/2009 | |
| KR | 10-2004-0101280 | | 12/2004 | |
| KR | 10-0599053 | | 7/2006 | |
| KR | 10-2007-0055258 | | 5/2007 | |
| KR | 10-2007-0063300 | | 6/2007 | |
| KR | 10-2008-0090134 | | 10/2008 | |
| KR | 10-2009-0047328 | | 5/2009 | |
| WO | WO2007112926 A2 * | 10/2007 | | |
| WO | WO2009078815 A1 * | 6/2009 | | B01J 21/18 |
| WO | WO2009145393 A1 * | 12/2009 | | B82B 3/00 |

OTHER PUBLICATIONS

Yang et al. ("XPS Demonstration of pi-pi Interaction between Benzyl Mercaptan and Multiwalled Carbon Nanotubes and Their Use in the Adhesion of Pt Nanoparticles." Chem Mater, 18, pp. 5033-5038, Sep. 9, 2006).*

Li et al. ("Preparation of Nanocomposites of Metals, Metal Oxides, and Carbon Nanotubes via Self-Assembly." J. Am. Chem. Soc., 129 (30), pp. 9401-9409, Publication Date (Web): Jul. 6, 2007).*

Yang, et al., "Controllable deposition of Ag nanoparticles on carbon nanotubes as a catalyst for hydrazine oxidation," *Carbon*, vol. 46, pp. 747-752 (2008).

* cited by examiner

CONDUCTIVE CARBON NANOTUBE-METAL COMPOSITE INK

CROSS-REFERENCE TO RELATED APPLICATIONS

This application claims priority under U.S.C. §119 to Korean Patent Application No. 10-2010-0014732, filed on Feb. 18, 2010, in the Korean Intellectual Property Office (KIPO), the entire contents of which are incorporated by reference.

BACKGROUND

1. Field

Example embodiments relate to conductive carbon nanotube-metal composite inks for printed electronics and method of manufacturing the same.

2. Description of the Related Art

Recently, in line with the development of inkjet printing technology, there has been an increased interest in printed electronics and research into ink suitable for use in inkjet printing technology. Various kinds of metal nanoparticle-based conductive nano-inks, which may be used in an electronic substrate, are vital in inkjet printing technology. Such conductive nano-inks may be used as a core material of various elements, e.g., electrodes of electronic devices, interconnectors and/or micro-patterned wirings.

To prepare the conductive nano-inks, research into nano-inks based on gold or silver nanoparticles, which are more electrically conductive than other metals, is being conducted. However, the cost of precious metals, e.g., gold and/or silver is relatively high, and thus, these precious metals have not been widely used in electronic industries.

SUMMARY

Provided are conductive carbon nanotube-metal composite inks for printed electronics and method of manufacturing the same. Additional aspects will be set forth in part in the description which follows and, in part, will be apparent from the description, or may be learned by practice of example embodiments.

According to example embodiments, a conductive carbon nanotube-metal composite ink may include a carbon nanotube-metal composite including first metal nanoparticles and a carbon nanotube, wherein the first metal nanoparticles are deposited on a surface of the carbon nanotube by chemical self-assembly; and an organic solvent.

According to example embodiments, a method of manufacturing a conductive carbon nanotube-metal composite ink may include forming a carbon nanotube-metal composite in an organic solvent by depositing first metal nanoparticles on a surface of at least one carbon nanotube by chemical self-assembly to form a solution.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
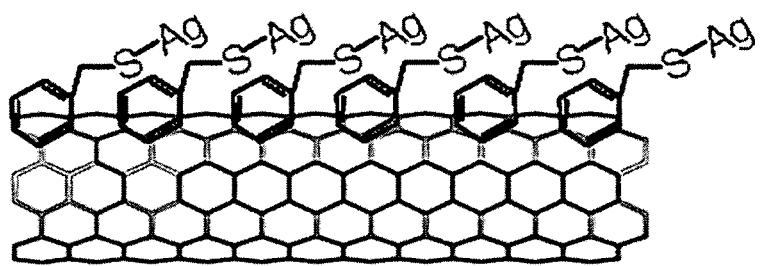
FIG. 1 is a schematic diagram illustrating a structure of a carbon nanotube-metal composite used in a conductive carbon nanotube-metal composite ink, according to example embodiments.

Reference will now be made in detail to example embodiments, examples of which are illustrated in the accompanying drawings, wherein like reference numerals refer to the like elements throughout. In this regard, example embodiments may have different forms and should not be construed as being limited to the descriptions set forth herein. Accordingly, example embodiments are merely described below, by referring to the figures, to explain aspects of the present description. In the drawings, the thicknesses of layers and regions are exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

A conductive carbon nanotube-metal composite ink according to example embodiments may include a carbon nanotube-metal composite in which first metal nanoparticles are deposited on a surface of a carbon nanotube by chemical self-assembly; second metal nanoparticles; and an organic solvent.

A carbon nanotube (CNT) may exhibit semiconductive properties and metallic properties according to chirality, and may have improved electrical characteristics, compared with commonly used silicon-based electronic devices. In addition, the CNT is a nano material having improved mechanical strength, thermal conductivity, and chemical stability.

The conductive carbon nanotube-metal composite ink may introduce a conductive carbon nanotube in order to have higher electrical conductivity than that of a commonly used metal nano-ink. The conductive carbon nanotube-metal composite ink may include the carbon nanotube-metal composite in which the first metal nanoparticles are deposited on the surface of the carbon nanotube, the second metal nanoparticles, and the organic solvent.

In the carbon nanotube-metal composite used in the conductive carbon nanotube-metal composite ink, the first metal nanoparticles may be deposited on the surface of the carbon nanotube by chemical self-assembly.

FIG. 1 is a schematic diagram illustrating a structure of a carbon nanotube-metal composite used in a conductive carbon nanotube-metal composite ink, according to example embodiments.

Referring to FIG. 1, first metal nanoparticles that are functionalized with a compound having an aromatic hydrocarbon group and a thiol group may be deposited on a surface of a carbon nanotube to form a self-assembled layer. In particular, in FIG. 1, silver (Ag) nanoparticles functionalized with benzyl mercaptan may be deposited on the surface of the carbon nanotube to form a self-assembled layer. However, the carbon nanotube-metal composite is not limited thereto.

When the first metal nanoparticles are functionalized with the compound having an aromatic hydrocarbon group and a thiol group, agglomeration of metal nanoparticles may be prevented or reduced, and the size of the metal nanoparticles may easily be adjusted. In this regard, the functionalized first metal nanoparticles may be bound to the surface of the carbon nanotube by the aromatic hydrocarbon group via π-π interactions.

The compound having an aromatic hydrocarbon group and a thiol group may include a compound having a substituted or unsubstituted $C_6$-$C_{20}$ aryl group and a thiol group. In particular, examples of the compound having an aromatic hydrocarbon group and a thiol group may include benzyl mercaptan, benzenethiol, triphenylmethanethiol, bromobenzyl mercaptan, aminothiophenol, 2-phenylethanethiol, and mixtures thereof. More particularly, the compound having an aromatic hydrocarbon group and a thiol group may be benzyl mercaptan, but is not limited thereto.

As described above, the first metal nanoparticles functionalized with the compound having an aromatic hydrocarbon group and a thiol group may be bound to the surface of the carbon nanotube by chemical self-assembly, thereby being uniformly deposited on the surface of the carbon nanotube.

The carbon nanotube used in the carbon nanotube-metal composite may include at least one selected from the group consisting of a single-walled carbon nanotube, a double-walled carbon nanotube, a multi-walled carbon nanotube, a carbon nanotube bundle, and mixtures thereof.

The first metal nanoparticles used in the carbon nanotube-metal composite may include silver (Ag), copper (Cu), gold (Au), nickel (Ni), aluminum (Al), platinum (Pt), magnesium (Mg), palladium (Pd), iron (Fe), and alloys thereof. The functionalized first metal nanoparticles may be prepared by mixing the compound having an aromatic hydrocarbon group and a thiol group with a precursor containing the metal component described above, e.g., chloride, nitride, cyanide, sulfide, bromate, nitrate, acetate and/or sulfate, and the first metal nanoparticles may be mixed with a carbon nanotube to prepare a carbon nanotube-metal composite.

The amount of the carbon nanotube-metal composite may be in the range of about 0.001 to about 10 wt %, for example, in the range of about 0.005 to about 5 wt %. When the amount of the carbon nanotube-metal composite is within these ranges, carbon nanotube-metal composite particles may not agglomerate with each other, and the conductive carbon nanotube-metal composite ink may exhibit relatively high electrical conductivity although a smaller amount of the carbon nanotube-metal composite is used.

The second metal nanoparticles used in the conductive carbon nanotube-metal composite ink may include at least one selected from the group consisting of Ag, Cu, Au, Ni, Al, Pt, Mg, Pd, Fe, and alloys thereof. The size of the second metal nanoparticles may be in the range of about 0.1 to about 100 nm so as to be suitable for use in ink for printed electronics. The second metal nanoparticles may be the same as or different from the first metal nanoparticles.

The amount of the second metal nanoparticles may be in the range of about 0.5 to about 20 wt %, for example, in the range of about 1 to about 15 wt %. When the amount of the second metal nanoparticles is within these ranges, carbon nanotube-metal composite particles may not agglomerate with each other, and the conductive carbon nanotube-metal composite ink may exhibit relatively high electrical conductivity without an increase in electric resistance.

To apply the conductive carbon nanotube-metal composite ink to printed electronics, the dispersity of a solute in the conductive carbon nanotube-metal composite ink needs to be obtained so that the ink may be smoothly ejected from inkjet nozzles, and the conductive carbon nanotube-metal composite ink needs to satisfy physical properties required for inkjet printing apparatuses, e.g., viscosity, surface tension and a boiling point of ink.

The organic solvent used in the conductive carbon nanotube-metal composite ink may include, but is not limited to, α-terpineol, polyvinylpyrrolidone, ethylene glycol, diethylene glycol, polyethylene glycol, dimethylformamide, poly(3,4-ethylenedioxythiophene)-poly(styrene sulfonate), butyl benzene, methanol, 2-methoxy ethanol, or N-methyl-2-pyrrolidone. The organic solvent may be used alone or in a combination of at least two of these compounds. The amount of the organic solvent may be in the range of about 70 to about 99.499 wt %, for example, in the range of about 80 to about 98.995 wt %.

The organic solvent may be a mixed solvent prepared by mixing α-terpineol and ethylene glycol at a constant ratio. In this regard, α-terpineol and ethylene glycol may be mixed at a weight ratio in the range of about 70:30 to about 95:5. When the organic solvent of α-terpineol and ethylene glycol mixed at such a ratio is used, the ejection performance of the conductive carbon nanotube-metal composite ink for inkjet printing may be obtained by adjusting the viscosity and boiling point of the conductive carbon nanotube-metal composite ink.

When conductive wirings are formed using the conductive carbon nanotube-metal composite ink, pores between the second metal nanoparticles may be connected by carbon nanotubes having a relatively high slenderness ratio, thereby acting as an electrical path. In addition, because the first metal nanoparticles are uniformly deposited on the surface of the carbon nanotube, electric contact resistance between the carbon nanotubes and the second metal nanoparticles may be reduced. As a result, the conductive wirings may have relatively high conductivity.

Example embodiments will now be described in further detail with reference to the following Examples. However, these examples are for illustrative purposes only and are not intended to limit the scope of example embodiments.

Preparation Example

Preparation of Carbon Nanotube-Metal Composite

First, 100 ml of ethanol and 1.18 ml of benzyl mercaptan was mixed, and 0.8 ml of the resultant solution and 100 ml of ethanol in which 0.34 g of $AgNO_3$ was dissolved were mixed at a molar ratio of benzyl mercaptan to Ag of 1:25 to prepare white Ag colloid. Subsequently, the mixture was strongly stirred for about 48 hours, and the resultant solution turned dark brown, accordingly. As a result, Ag nanoparticles functionalized with benzyl mercaptan were synthesized.

50 mg of a thin single-walled carbon nanotube was mixed with 400 ml of ethanol, and ultrasonic waves (42 kHz, 560 W) were applied to the mixture for 20 minutes. Thereafter, 150 ml of the Ag nanoparticle solution was added to the resultant mixture, and ultrasonic waves (42 kHz, 560 W) were applied thereto for 10 minutes. Ultrasonic waves were applied to the resultant solution by using a bath type sonicator (42 kHz, 135 W) for about 8 hours. The resultant solution was washed with ethanol and filtered to obtain a carbon nanotube-metal composite in which the Ag nanoparticles were deposited on a surface of the carbon nanotube.

Figure 2:
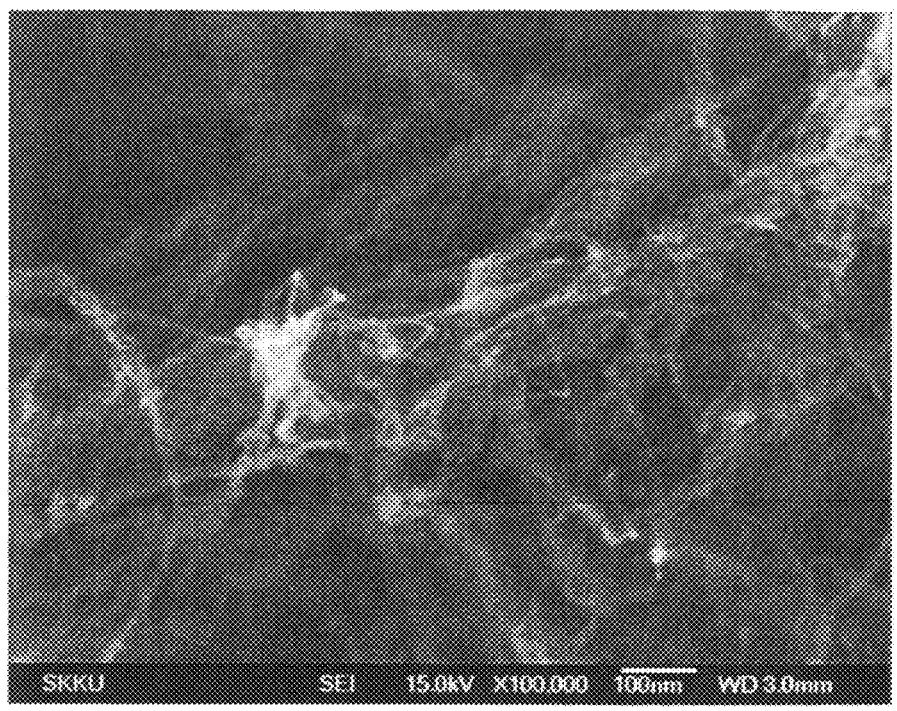
FIG. 2 is an electronic microscopic image of a carbon nanotube-metal composite prepared according to Preparation Example.

FIG. 2 is an electronic microscopic image of the carbon nanotube-metal composite prepared according to Preparation Example. Referring to FIG. 2, the Ag nanoparticles are uniformly deposited on the surface of the carbon nanotube.

Example 1

0.1 g of the carbon nanotube-metal composite of Preparation Example was mixed with a mixed solution of 82.03 g of α-terpineol and 10.87 g of ethylene glycol, and the resultant solution was stirred while ultrasonic waves (42 kHz, 560 W) were applied thereto for 20 minutes. Subsequently, 7 g of Ag nanoparticles each having a diameter in the range of about 1 to about 50 nm were added to the resultant solution, and the resultant product was ultrasonically fragmented at 540 Watts for 20 minutes to prepare a conductive carbon nanotube-metal composite ink.

Example 2

A conductive carbon nanotube-metal composite ink was prepared in the same manner as in Example 1, except that 0.03 g of the carbon nanotube-metal composite and 3.5 g of the Ag nanoparticles were used.

Example 3

A conductive carbon nanotube-metal composite ink was prepared in the same manner as in Example 1, except that 0.01 g of the carbon nanotube-metal composite and 3.5 g of the Ag nanoparticles were used.

Comparative Example

A conductive carbon nanotube-metal composite ink was prepared in the same manner (the same conditions of the solvent and the ultrasonic waves) as in Example 1, except that the carbon nanotube-metal composite was not used, and 7.1 g of the Ag nanoparticles was used.

Evaluation of Electrical Conductivity

To evaluate the electrical conductivity of each of the conductive carbon nanotube-metal composite inks of Examples 1 through 3 and the Comparative Example, each conductive carbon nanotube-metal composite ink was dropped on a slide glass to make a certain pattern, and the ink was cured at 350° C. and 450° C. for 1 hour. The formed pattern had a length of 20 mm, a width of 5 mm, and a thickness of 0.001 mm. To measure a specific resistance value of the formed pattern, a resistance (R) value of the pattern was calculated using a four-point probe method. The specific resistance and electrical conductivity of each conductive carbon nanotube-metal composite ink were calculated using a correction factor considering the thickness and shape of the pattern and the calculated resistance value of the pattern, and the results are shown in Table 1 below.

Equation for specific resistance: $\rho = G \times R$, $G = 3.575 \times t$ where ρ denotes a specific resistance, R denotes a resistance value, G denotes a shape correction factor, and t denotes the thickness of a pattern)

$$\sigma = \frac{1}{\rho}$$

where σ denotes electrical conductivity, and ρ denotes a specific resistance.

TABLE 1

| | Electrical conductivity (S/cm) | |
|---|---|---|
| | 350° C. | 450° C. |
| Example 1 | 5.00 × 10⁵ | 5.35 × 10⁵ |
| Example 2 | 4.90 × 10⁵ | 5.53 × 10⁵ |

TABLE 1-continued

| | Electrical conductivity (S/cm) | |
|---|---|---|
| | 350° C. | 450° C. |
| Example 3 | $4.98 \times 10^5$ | $5.78 \times 10^5$ |
| Comparative Example | $2.39 \times 10^5$ | $2.38 \times 10^5$ |

As shown in Table 1, the conductive carbon nanotube-metal composite inks of Examples 1 through 3, each including the carbon nanotube-metal complex, have electrical conductivity that is about two times greater than that of the conductive carbon nanotube-metal composite ink of Comparative Example.

The conductive carbon nanotube-metal composite inks of Examples 1 through 3 have higher electrical conductivity than a commonly used metal ink when even a smaller amount of metal nanoparticles is used. This indicates that the conductive carbon nanotube-metal composite ink of Examples 1 through 3 exhibit higher electrical conductivity, even compared with pure Cu having an electrical conductivity of $5.96 \times 10^5$ S/cm and pure Ag having an electrical conductivity of $6.29 \times 10^5$ S/cm.

As described above, according to example embodiments, the conductive carbon nanotube-metal composite ink may have higher conductivity than a commonly used conductive nano-ink based on nanoparticles of metal, e.g., gold and/or silver, and may be widely used in next-generation electronic devices for transmitting electricity at a higher frequency and higher speed, which requires relatively high conductivity. In addition, the conductive carbon nanotube-metal composite ink may maintain electrical properties due to the bending and stretching properties of the carbon nanotube itself, and thus may be used to prepare deformable conductive wirings. Thus, the conductive carbon nanotube-metal composite ink may also be used in a new concept of deformable electronic devices that are flexible and stretchable, as well as commonly used electronic devices.

It should be understood that example embodiments described herein should be considered in a descriptive sense only and not for purposes of limitation. Descriptions of features or aspects within each example embodiment should typically be considered as available for other similar features or aspects in other example embodiments.

What is claimed is:

1. A conductive carbon nanotube-metal composite ink comprising:
    a carbon nanotube-metal composite including at least one carbon nanotube and a self-assembled layer on a surface of the at least one carbon nanotube, wherein the self-assembled layer includes first metal nanoparticles;
    second metal nanoparticles separate from the carbon nanotube-metal composite; and
    an organic solvent,
    wherein the amount of the carbon nanotube-metal composite is in a range of about 0.005 to about 5 wt %, the amount of the second metal nanoparticles is in a range of about 1 to about 15 wt %, and the amount of the organic solvent is in a range of about 80 to about 98.995 wt % based on the total wt % of the carbon nanotube-metal composite, the second metal nanoparticles and the organic solvent.

2. The conductive carbon nanotube-metal composite ink of claim 1, wherein the carbon nanotube-metal composite further comprises:
    a compound having an aromatic hydrocarbon group and a thiol group functionalized with the first metal nanoparticles,
    wherein the functionalized first metal nanoparticles are deposited on the surface of the at least one carbon nanotube to form the self-assembled layer.

3. The conductive carbon nanotube-metal composite ink of claim 2, wherein the compound having an aromatic hydrocarbon group and a thiol group comprises at least one selected from the group consisting of benzyl mercaptan, benzenethiol, triphenylmethanethiol, bromobenzyl mercaptan, aminothiophenol, 2-phenylethanethiol, and mixtures thereof.

4. The conductive carbon nanotube-metal composite ink of claim 1, wherein the at least one carbon nanotube comprises at least one selected from the group consisting of a single-walled carbon nanotube, a double-walled carbon nanotube, a multi-walled carbon nanotube, a carbon nanotube bundle, and mixtures thereof.

5. The conductive carbon nanotube-metal composite ink of claim 1, wherein the organic solvent comprises at least one selected from the group consisting of α-terpineol, polyvinylpyrrolidone, ethylene glycol, diethylene glycol, polyethylene glycol, dimethylformamide, poly(3,4-ethylenedioxythiophene)-poly(styrene sulfonate), butyl benzene, methanol, 2-methoxy ethanol, and N-methyl-2-pyrrolidone.

6. The conductive carbon nanotube-metal composite ink of claim 5, wherein the organic solvent is a mixed solvent of α-terpineol and ethylene glycol.

7. The conductive carbon nanotube-metal composite ink of claim 6, wherein α-terpineol and ethylene glycol are mixed at a weight ratio in a range of about 70:30 to about 95:5.

8. The conductive carbon nanotube-metal composite ink of claim 1, wherein the first metal nanoparticles are deposited on the surface of the at least one carbon nanotube uniformly.

9. The conductive carbon nanotube-metal composite ink of claim 1, wherein the first metal nanoparticles comprise at least one selected from the group consisting of silver (Ag), copper (Cu), gold (Au), nickel (Ni), aluminum (Al), platinum (Pt), magnesium (Mg), palladium (Pd), iron (Fe), and alloys thereof.

10. The conductive carbon nanotube-metal composite ink of claim 1, wherein the second metal nanoparticles comprise at least one selected from the group consisting of silver (Ag), copper (Cu), gold (Au), nickel (Ni), aluminum (Al), platinum (Pt), magnesium (Mg), palladium (Pd), iron (Fe), and alloys thereof.

* * * * *